(12) United States Patent
Castle et al.

(10) Patent No.: US 11,416,193 B2
(45) Date of Patent: Aug. 16, 2022

(54) PHYSICAL UNCLONABLE FUNCTION (PUF) ALTERS DISK STRUCTURE TO ENCODE REGION

(71) Applicant: LEXMARK INTERNATIONAL, INC., Lexington, KY (US)

(72) Inventors: Scott Richard Castle, Lexington, KY (US); Gary Allen Denton, Lexington, KY (US); Robert Henry Muyskens, Lexington, KY (US); Samuel Leo Rhodus, Lexington, KY (US); Brant Dennis Nystrom, Lexington, KY (US); Carl Edmond Sullivan, Stamping Ground, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 16/822,365

(22) Filed: Mar. 18, 2020

(65) Prior Publication Data

US 2021/0334052 A1 Oct. 28, 2021

Related U.S. Application Data

(60) Provisional application No. 62/822,495, filed on Mar. 22, 2019.

(51) Int. Cl.
| | | |
|---|---|---|
| *G06F 3/12* | (2006.01) | |
| *H04L 9/32* | (2006.01) | |
| *G03G 15/22* | (2006.01) | |
| *G03G 21/00* | (2006.01) | |
| *G06K 15/10* | (2006.01) | |
| *G03G 15/00* | (2006.01) | |

(52) U.S. Cl.
CPC ............ *G06F 3/1238* (2013.01); *G06F 3/121* (2013.01); *H04L 9/3278* (2013.01); *G03G 15/223* (2013.01); *G03G 15/553* (2013.01); *G03G 21/0005* (2013.01); *G06K 15/102* (2013.01)

(58) Field of Classification Search
None
See application file for complete search history.

(56) References Cited

U.S. PATENT DOCUMENTS

| | | |
|---|---|---|
| 4,866,382 A | 9/1989 | Carmen |
| 5,181,074 A | 1/1993 | Nemoto et al. |

(Continued)

FOREIGN PATENT DOCUMENTS

| | | |
|---|---|---|
| DE | 10200804325 A1 | 5/2010 |
| DE | 102008043265 A1 | 5/2010 |
| WO | 2018115068 A1 | 6/2018 |

OTHER PUBLICATIONS

U.S. Patent and Trademark Office; Non-final Office Action, U.S. Appl. No. 16/822,355 dated Jun. 7, 2021.

(Continued)

*Primary Examiner* — Haris Sabah

(57) ABSTRACT

A physical unclonable function ("PUF") object can be used to encode the geography or region in which device to which the PUF is attached may operate. Disclosed are two potential ways to regionalize a device using a PUF disk: placing the magnetic sensor at a different radius depending on the region or geography intended for sale; and altering the magnetic structure of the disk to magnetically encode the region into the sensor data.

6 Claims, 3 Drawing Sheets

(56) References Cited

U.S. PATENT DOCUMENTS

| | | | |
|---|---|---|---|
| 5,491,633 A | 2/1996 | Henry | |
| 6,259,219 B1 | 7/2001 | Strauch | |
| 9,122,252 B2 | 9/2015 | Kimura | |
| 9,361,562 B1 | 6/2016 | Hanina | |
| 9,553,582 B1 | 1/2017 | Booth et al. | |
| 9,589,399 B2 | 3/2017 | Taveau | |
| 9,665,748 B1* | 5/2017 | Ahne | G06Q 10/00 |
| 2009/0128135 A1 | 5/2009 | Masham | |
| 2014/0304167 A1 | 9/2014 | Atkinson | |
| 2015/0193632 A1 | 7/2015 | Golac | |
| 2017/0100862 A1* | 4/2017 | Denton | G09C 1/00 |
| 2017/0102668 A1 | 4/2017 | Cannon | |
| 2017/0103791 A1 | 4/2017 | Booth | |
| 2017/0103834 A1 | 4/2017 | Booth | |
| 2017/0103843 A1 | 4/2017 | Nakanoue | |
| 2017/0104600 A1 | 4/2017 | Booth | |
| 2018/0006830 A1 | 1/2018 | Cambou | |
| 2018/0009110 A1 | 1/2018 | Langford | |
| 2018/0167526 A1* | 6/2018 | Cannon | H04N 1/00875 |
| 2019/0280858 A1* | 9/2019 | Cambou | H04L 9/0866 |

OTHER PUBLICATIONS

U.S. Patent and Trademark Office; Non-final Office Action, U.S. Appl. No. 16/822,347 dated Jun. 10, 2021.
International Search Report; PCT application # PCT/US2020/23308, dated Aug. 6, 2020.
International Search Report, US PCT application No. PCT/US20/23315 dated Jun. 18, 2020.
International Search Report, US PCT application No. PCT/US20/023312, dated Jul. 23, 2020.

* cited by examiner

PHYSICAL UNCLONABLE FUNCTION (PUF) ALTERS DISK STRUCTURE TO ENCODE REGION

CROSS REFERENCES TO RELATED APPLICATIONS

U.S. patent application Ser. No. 16/822,347, titled "Physical Unclonable Function Encoder," and U.S. patent application Ser. No. 16/822,355, titled "Physical Unclonable Function Variable Read Sensor."

PRIORITY CLAIM FROM PROVISIONAL APPLICATION

The present application is related to and claims priority under 35 U.S.C. 119(e) from U.S. provisional application No. 62/822,495, filed Mar. 22, 2019, titled "Physical Unclonable Function Encoder," the content of which is hereby incorporated by reference herein in its entirety.

BACKGROUND

The present disclosure relates generally using a PUF object to encode the geographical region in which a device may operate.

SUMMARY

A physical unclonable function ("PUF") object can be used to encode the geography or region in which device to which the PUF is attached may operate. Printer manufacturers typically regionalize their printers and toner cartridges so that a printer sold in region one will only accept a region one specific cartridge. Disclosed here are two potential ways to regionalize a device such as a printer toner cartridge using a PUF disk include: placing the magnetic sensor at a different radius depending on the region or geography intended for sale; and altering the magnetic structure of the disk to magnetically encode the region into the sensor data.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

Figure 1:
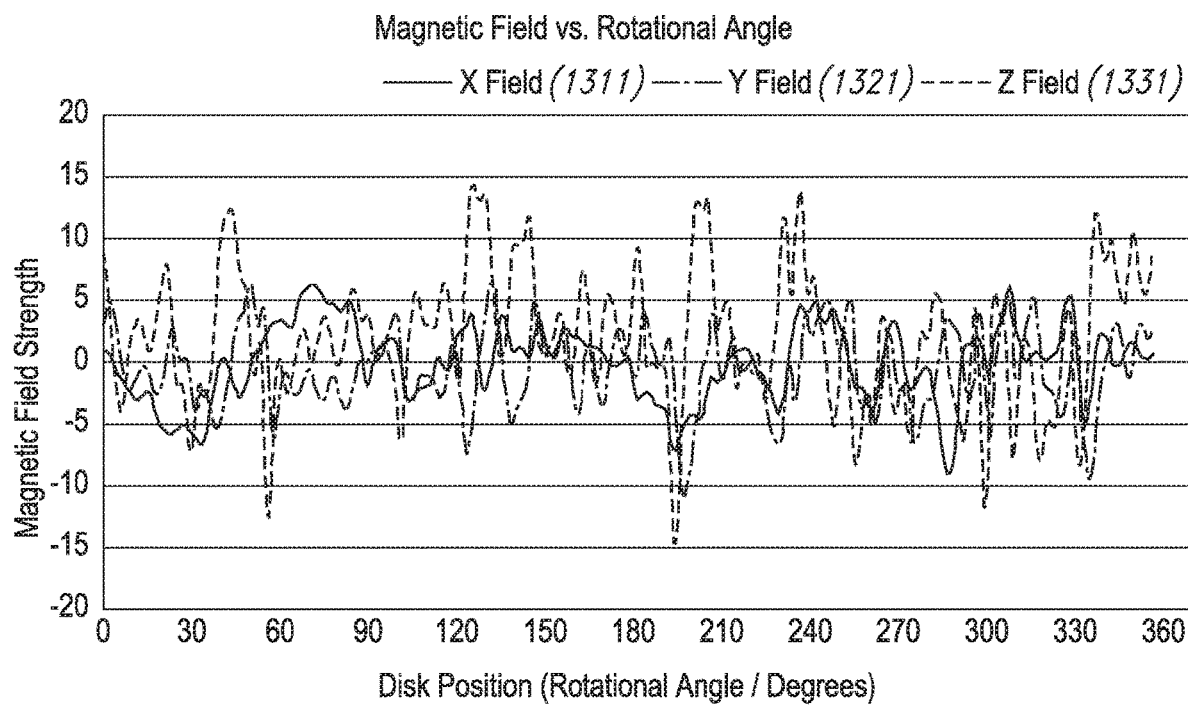
FIG. 1 shows example magnetic field strengths versus rotational angle for a magnetic physical unclonable function disk.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having," "containing," "including," "comprising," and the like are open ended terms that indicate the presence of stated elements or features, but do not preclude additional elements or features. The articles "a," "an," and "the" are intended to include the plural as well as the singular, unless the context clearly indicates otherwise. The use of "including," "comprising," or "having," and variations thereof herein is meant to encompass the items listed thereafter and equivalents thereof as well as additional items.

Terms such as "about" and the like have a contextual meaning, are used to describe various characteristics of an object, and such terms have their ordinary and customary meaning to persons of ordinary skill in the pertinent art. Terms such as "about" and the like, in a first context mean "approximately" to an extent as understood by persons of ordinary skill in the pertinent art; and, in a second context, are used to describe various characteristics of an object, and in such second context mean "within a small percentage of" as understood by persons of ordinary skill in the pertinent art.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top," "bottom," "front," "back," "rear," and "side," "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc., and are also not intended to be limiting. Like terms refer to like elements throughout the description.

One use of PUF disks and sensors is for printer toner cartridge security chip authentication as set forth in U.S. Pat. No. 9,553,582, titled "Physical Unclonable Functions Having Magnetic and Non-Magnetic Particles," the content of which is hereby incorporated by reference herein in its entirety. PUFs (Physical Unclonable Function) use at least one 3-axis Hall-effect sensor for enrollment. When the toner cartridge, or other PUF enabled device, is manufactured, one or more Hall-effect sensors are used to record the cartridge's magnetic profile (signature) and store that data in the non-volatile random-access memory ("NVRAM") of the cartridge or in the cloud where the data may be accessed. This process is called "enrollment." When a PUF enabled toner cartridge is placed inside a printer, the Hall-effect sensor is seated at a fixed position and distance from the PUF disk. This patent invention describes an alternate usage for these PUF disks and sensors within a printing device. These disks can be used to encode the geography or "region" in which a specific device or cartridge should work.

Printer manufacturers typically regionalize their printers and toner cartridges so that a printer sold in region one will only accept a region one specific cartridge. Cartridge regionalization is typically achieved by the cartridge security chip. The printer and cartridge are electronically keyed to work together. Disclosed here is an approach to mechanically and electronically key the cartridge region using a PUF disk.

The PUF disk contains a mixture of magnetic and non-magnetic particles dispersed on the disk substrate. When this disk spins in the presence of the magnetic sensor(s), a magnetic field vector is determined (x, y, & z field strengths). Those field strengths 1311, 1321, 1331 are often plotted in a chart such as in FIG. 1. The type, size, and quantity of magnetic and non-magnetic particles used to create the PUF disk will affect the typical field strength plot's shape (max/min amplitudes, inflection point frequency, etc.).

Figure 2:
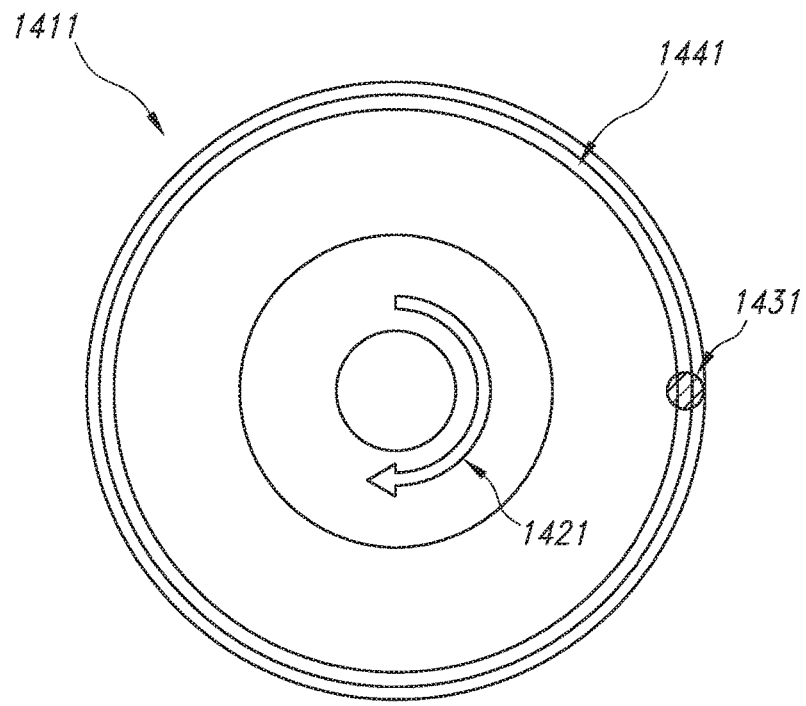
FIG. 2 shows an example of how a PUF disk rotates in front of a sensor to capture a specific scan band of data.

FIG. 2 shows an example of how a PUF disk 1411, mounted on a device, such as a printer toner cartridge (not shown), rotates 1421 in front of a sensor 1431 to capture a specific "scan band" 1441 of data.

Two potential ways to "regionalize" a device such as a printer toner cartridge using a PUF disk include: (1) placing the magnetic sensor at a different radius depending on the region or geography intended for sale; and (2) by altering the magnetic structure of the disk to "magnetically encode" the region into the sensor data in a variety of ways.

Figure 3:
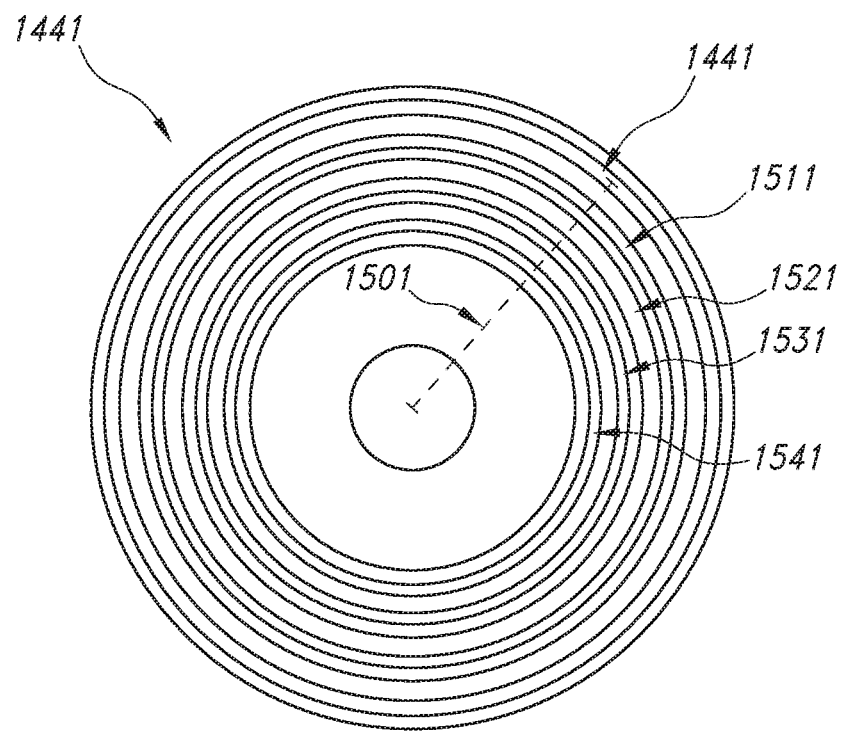
FIG. 3 shows different radius sensor positions on a single PUF disk depending on the region or geography.

To regionalize by the sensor radius, the region can be keyed mechanically by placing the magnetic sensor within the printer or other reading device at a different radius depending on the region or geography it is sold in as shown FIG. 3. The band of data 1441 from FIG. 2 is shown for reference at radius 1501. At the time of cartridge manufacturing, the additional enrollment magnetic field bands 1511, 1521, 1531, 1541 are scanned at the appropriate radius to correspond to the specific region. That scanned enrollment data is then stored in a secure non-volatile random-access memory ("NVRAM") on the device or in the cloud, which can be accessed by the device. If a cartridge is inserted into a machine with a non-matching geography the sensor data captured at the time of manufacturing will not match the enrollment data read by the sensor in the printer.

Figure 4:
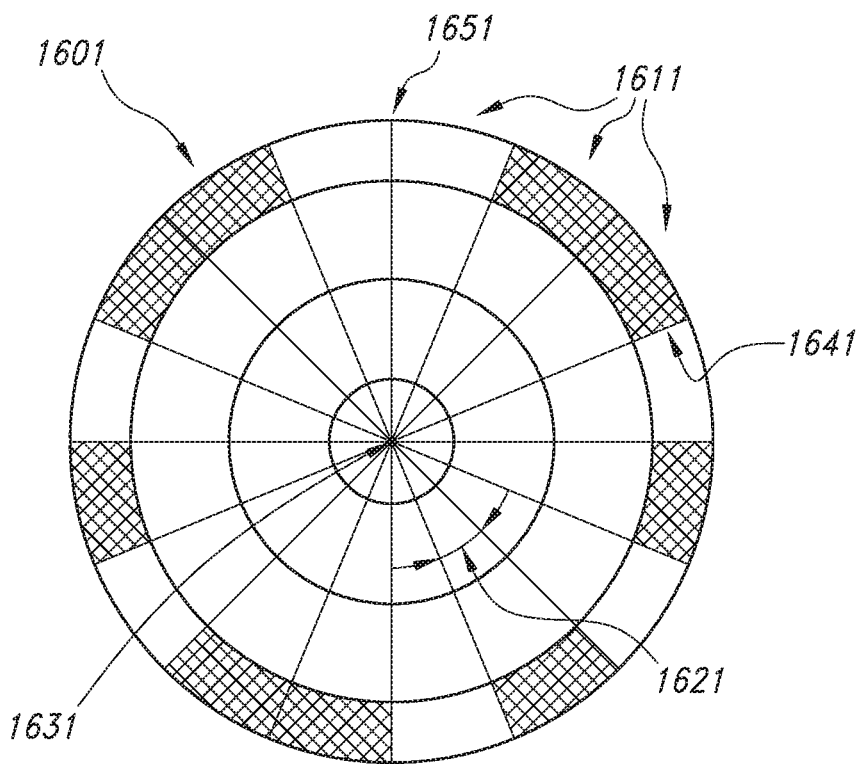
FIG. 4 shows a PUF disk divided into 16 segments.
Figure 5:
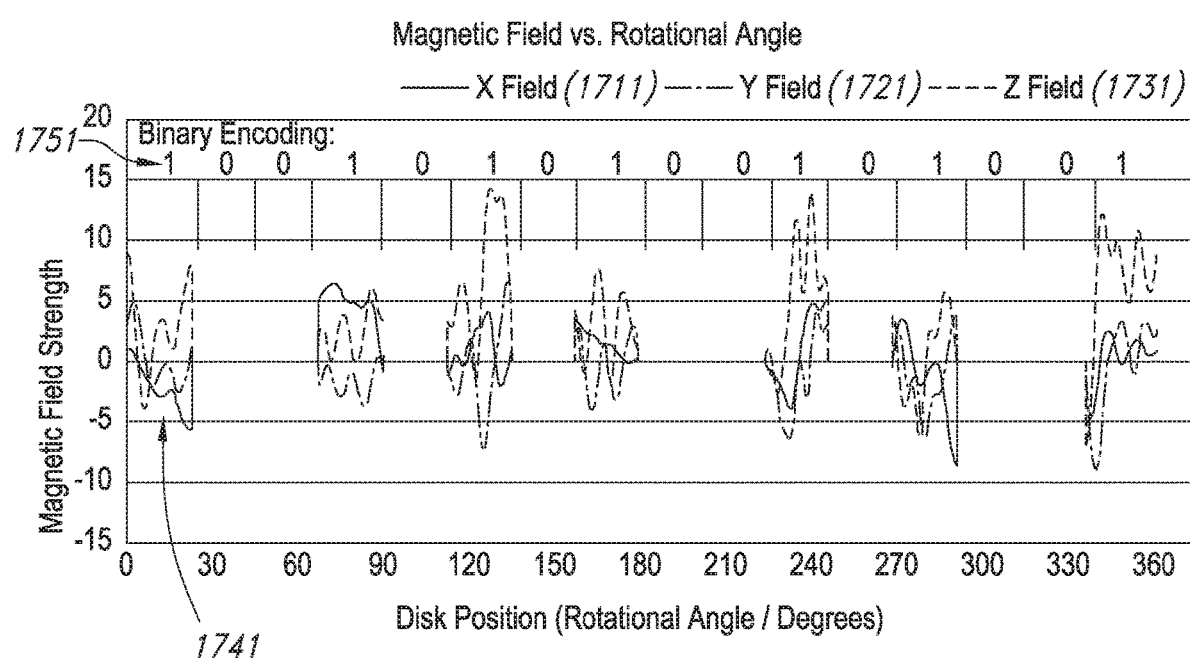
FIG. 5 shows the magnetic field values for each segment in the outer ring of the disk in FIG. 4 beginning at the home position of the disk.

A PUF disk can also be physically manufactured in a way that alters the magnetic structure of the disk to "magnetically encode" the region into the sensor data in one of, at least, four ways. First, binary representation can be used to encode the region based on the presence and absence of magnetic field "voids," or areas where the magnetic field is unchanged. This may be accomplished by removing all magnetic particles and creating a "zero field" area, or by covering a region with a constant directional field. So, if for example every 10 degrees represents 1 bit of data encoding capability, and a void signifies a binary 0 while arbitrary magnetic field signifies a 1, then 36 bits of regionalization data could be encoded onto a PUF disk. FIG. 4 shows a disk divided into 16 segments (bits) 1611 each 22.5 degrees in angular arc 1621 measured from the center of the disk 1631. FIG. 5 shows the magnetic field values 1711, 1721, 1731 for each segment in the outer ring 1641 of the disk 1601 in FIG. 4 beginning at the home position 1651 of the disk 1601. Moving clockwise in the outer ring 1641, the first segment shows magnetic field values 1741, corresponding to a binary encoding of "1," while the next two segments that are covered do not show a signal, corresponding to a binary encoding of "0."

Second, the addition of a number of magnetic field "voids," or areas where the magnetic field is unchanged, magnetically encodes the disk. If six voids are seen while scanning the disk, this disk works only in region six, "Australia," for example, if that is designated as region six.

Third, addition of the same structural magnetic field "voids," but then determining the associated region based on the linear or angular distance between two "voids," can be used to magnetically encode the disk. For example, every 10 degrees of separation might equal one region. Therefore, two voids with a 60 degree rotational separation would represent region six, "Australia."

Finally, the length of the magnetic field void (in linear or radial distance) can be used to define the device regionalization. As an example, every 10 degrees of void length could represent a region. A 30 degree arc void length in this sample would equate to a "region three" device or printer toner cartridge.

Just as devices or printer toner cartridges can be "regionalized," a device may be restricted to specific uses with the same approaches described. One skilled in the art would recognize that other data, not limited just to regionalization information, could be stored on a PUF device by using any of the previously described methods. Examples might include a PUF device's serial number, enrollment magnetic fingerprint, expiration date, etc.

The foregoing description of embodiments has been presented for purposes of illustration. It is not intended to be exhaustive or to limit the present disclosure to the precise steps and/or forms disclosed, and obviously many modifications and variations are possible in light of the above teaching. It is intended that the scope of the invention be defined by the claims appended hereto.

We claim:

1. A method of regionally encoding a device comprising:
   manufacturing a magnetic physical unclonable function ("PUF") disk in a way that alters a magnetic structure of the disk to magnetically encode an intended region into a measured sensor data;
   enrolling the device during manufacturing by scanning the PUF at the appropriate position to correspond to the specific device's region;
   storing the scanned enrollment data in a secure non-volatile memory on the device for retrieval during authentication; and
   affixing the PUF disk to the device, wherein the magnetic structure is altered by a binary representation that is used to encode the region based on the presence and absence of magnetic field voids, or areas where the magnetic field is unchanged.

2. The method of claim 1, wherein at least 36 bits of regionalization data is encoded onto the PUF disk.

3. The method of claim 1, wherein any number of bit string lengths may be encoded onto the PUF disk.

4. The method of claim 1, wherein the addition of a number of magnetic field voids, or areas where the magnetic field is unchanged, without a binary representation magnetically encodes the disk.

5. The method of claim 1, wherein the linear or angular distance between added structural magnetic field voids or other structural elements is used to magnetically encode the disk.

6. The method of claim 1, wherein the length of an added magnetic field void or other structural element (in linear or radial distance) is used to magnetically encode the disk.

* * * * *